(12) United States Patent
Kissa et al.

(10) Patent No.: US 8,774,565 B2
(45) Date of Patent: Jul. 8, 2014

(54) ELECTRO-OPTIC DEVICE

(75) Inventors: Karl Kissa, West Simsbury, CT (US); Allen T. Hall, Ellington, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 293 days.

(21) Appl. No.: 13/270,876

(22) Filed: Oct. 11, 2011

(65) Prior Publication Data

US 2012/0099812 A1  Apr. 26, 2012

Related U.S. Application Data

(60) Provisional application No. 61/406,076, filed on Oct. 22, 2010.

(51) Int. Cl.
| | |
|---|---|
| *G02F 1/035* | (2006.01) |
| *G02F 1/225* | (2006.01) |
| *G02F 1/03* | (2006.01) |
| *G02F 1/21* | (2006.01) |

(52) U.S. Cl.
CPC ............ *G02F 1/2255* (2013.01); *G02F 1/0316* (2013.01); *G02F 2001/212* (2013.01)
USPC .......................................................... 385/2

(58) Field of Classification Search
USPC .......................................................... 385/2
See application file for complete search history.

(56) References Cited

U.S. PATENT DOCUMENTS

| | | | |
|---|---|---|---|
| 5,404,412 A | 4/1995 | Seino et al. | 385/2 |
| 5,680,497 A | 10/1997 | Seino et al. | 385/129 |
| 6,560,377 B2 | 5/2003 | Jones et al. | 385/2 |
| 6,853,757 B2 | 2/2005 | Seino | 385/2 |
| 6,867,134 B2 | 3/2005 | Chen et al. | 438/686 |
| 7,127,128 B2 | 10/2006 | Belmonte et al. | 385/2 |
| 7,529,433 B2 | 5/2009 | Kissa et al. | 385/8 |
| 7,844,149 B2 | 11/2010 | Kissa et al. | 385/40 |
| 2003/0062551 A1 | 4/2003 | Chen | 257/211 |
| 2003/0133638 A1 | 7/2003 | Jin et al. | 385/2 |
| 2006/0023288 A1 | 2/2006 | McBrien et al. | 359/245 |
| 2008/0170821 A1* | 7/2008 | Kissa et al. | 385/14 |

* cited by examiner

*Primary Examiner* — Jerry Blevins
(74) *Attorney, Agent, or Firm* — Matthew A. Pequignot; Pequignot + Myers LLC

(57) ABSTRACT

An electro-optic device is disclosed, in which an RF signal electrode is used as a bias ground electrode. Thus, for Z-cut lithium niobate electro-optic crystals, there is no need to place a buried bias electrode under the RF signal electrode and over the optical waveguide. As a result, both optical and the RF wave propagation losses are reduced. In another embodiment, a buried bias electrode is placed over the optical waveguide between two buffer layers having a different electrical conductivity. The buffer layer underneath the buried bias electrode has a larger electrical conductivity than the buffer layer above the buried bias electrode. The buffer layer underneath the buried bias electrode reduces the optical loss penalty due to the buried bias electrode located above the optical waveguide, while the buffer layer above the bias electrode reduces leakage currents.

12 Claims, 10 Drawing Sheets

ELECTRO-OPTIC DEVICE

CROSS-REFERENCE TO RELATED APPLICATIONS

The present invention claims priority from U.S. provisional patent application No. 61/406,076, filed Oct. 22, 2010, which is incorporated herein by reference.

TECHNICAL FIELD

The present invention relates generally to electro-optic devices and, more specifically, to electro-optic devices used in fiberoptic telecommunications.

BACKGROUND OF THE INVENTION

Electro-optic devices are frequently used in fiberoptic telecommunication systems to manipulate optical signals. Frequently, these electro-optic devices include at least one optical waveguide formed from and/or in an electro-optic material. When an electric field is generated in the electro-optic material, the refractive index of the optical waveguide(s) changes, and the optical signal propagating therethrough can be altered. Some examples of common electro-optic devices used in telecommunication systems include optical modulators, optical switches, optical couplers, etc.

One example of a commonly used electro-optic device is a Mach-Zehnder (MZ) optical modulator. Referring to FIG. 1A, there is shown an embodiment of a Mach-Zehnder optical modulator having an optical waveguide 20 formed in an electro-optic substrate 10. The optical waveguide 20 includes a first Y-branch 22, a first interferometer arm 24, a second interferometer arm 26, and a second Y-branch 28. An electrode structure, not shown in FIG. 1A, is provided near/adjacent the optical waveguide 20 for generating an electric field in one or both interferometer arms 24/26. For example according to one well known configuration, the electrode structure includes a signal electrode (also often referred to as a hot electrode) and two ground electrodes, which are configured to generate oppositely oriented electric fields in the first 24 and second 26 interferometer arms. Conventionally, the electrode structure is formed from a highly conductive metal such as gold (Au).

The exact position and design of the electrodes relative to the optical waveguide 20 is generally dependent on the substrate 10. If the substrate 10 is formed from X-cut lithium niobate ($LiNbO_3$), a signal electrode 40 is typically positioned on top of the substrate substantially between the interferometer arms 24/26, while ground electrodes 42/44 are positioned on top of the substrate 10 outside of the interferometer arms 24/26, as shown in FIG. 1B. In contrast, if the substrate 10 is formed from Z-cut $LiNbO_3$, the signal electrode 40 is typically positioned substantially directly above one interferometer arm 26, while the ground electrode 42 is positioned substantially directly above the other interferometer arm 24, as illustrated in FIG. 1C. In each case, the ground electrodes 42/44 are typically connected to ground, while the signal electrode 40 is connected to a high-frequency power source.

Referring to FIG. 1D, there is shown an embodiment of a Z-cut $LiNbO_3$ modulator 100, wherein a signal electrode 140 is connected to a high-frequency power source 145 at one end and to a terminal resistor 146 at the other end, such that it functions as a traveling-wave electrode. In operation, an optical signal is input into the left side of the device 100 where it is transmitted through an optical waveguide 120 until it is split at a first Y-branch 122, and then propagates equally along two isolated paths corresponding to two interferometer arms 124/126. Simultaneously, an RF data signal from the high-frequency power source 145 is transmitted through an RF transmission line 147 (e.g., a coaxial cable) to the signal electrode 140, which functions as a microwave transmission line. As the modulation voltage is applied between the signal electrode 140 and ground electrodes 142 and 144, an electric field is generated in an underlying electro-optic substrate 110. As illustrated in FIG. 1E, the vertical electric field lines in the first 124 and second 126 interferometer arms are oppositely oriented, such that the light propagating in each of the arms 124 and 126 is complementarily phase shifted relative to one another in a push-pull fashion. In accordance with the electro-optic effect, the electric field changes the refractive index within the interferometer arms 124 and 126, such that the input optical signal experiences constructive or destructive interference at a second Y-branch 128. This interference produces an amplitude modulated optical signal that is output at the right side of the device 100, wherein the modulation corresponds to the original RF data signal.

Notably, since the Z-axis of a $LiNbO_3$ crystal has the highest electro-optic coefficient, and the overlap with applied field is high, Z-cut $LiNbO_3$ modulators exhibit a relatively high modulation efficiency. Unfortunately, Z-cut $LiNbO_3$ modulators are also known to suffer more from charge build up problems, which may lead to temperature-induced bias drift and/or a DC-induced bias drift.

The term "temperature-induced bias drift" refers to drifting of the bias point of a modulator with changes in temperature. In $LiNbO_3$, the temperature induced bias drift typically arises from the pyroelectric effect, which creates mobile charges when temperature fluctuations cause a mechanical stress in the substrate. The mobile charges can generate sufficiently strong electric fields to change the bias point of the electro-optic modulator. In addition, since the electric fields induced by the pyroelectric effect in Z-cut $LiNbO_3$ are predominantly normal to the substrate, the mobile charges move toward the surface of the substrate, where the electrodes 140, 142, 144 are located. A bleed layer 160 is typically required near the surface of Z-cut $LiNbO_3$ to dissipate the accumulated electric charge. Optionally, additional bleed layers (not shown) are used to dissipate charge at the sides or bottom of the substrate. In general, the bleed layer 160 will be formed from a semiconductive material having enough resistance to prevent the highly conductive electrodes 140/142/144 from shorting out.

The term "DC-induced bias drift" refers to drifting of the bias point of a modulator as a low frequency or DC voltage is applied to the modulator for extended periods of time. In general, low frequency or DC voltages are required to control the bias point of the modulator, which is the point about which the swing of the modulated RF signal is accomplished. For example, in the embodiment of FIG. 1D, the RF data signal 145 includes an RF component superimposed on a DC or low frequency component.

The DC-induced bias drifts are particularly problematic when the modulator 100 includes a buffer layer 150 as shown in FIG. 1E. The buffer layer 150 is disposed between a substrate 110 and the signal electrode 140. If the buffer layer 150 has little conductivity relative to the substrate 110, mobile charges within the substrate 110, which may be in the form of electrons, holes, or ions, counteract the effect of the applied voltage, establishing a positive DC-induced bias drift. In addition, impurities in the buffer layer 150, which is typically formed from a dielectric material such as silicon dioxide ($SiO_2$), are believed to form additional mobile charge, which either counteracts the effect of the applied voltage, establishing a positive DC-induced bias drift, or enhances the applied bias voltage, establishing a negative DC-induced bias drift. The former is more common for undoped $SiO_2$. The end result of the mobile charge accumulation in the buffer and substrate is that the bias voltage required to operate the electro-optic modulator varies over time.

The purpose of the buffer layer 150 is two-fold. First, the buffer layer 150 is used to prevent optical absorption of the optical signal by the overlying electrodes 140/142. Notably, this is more important for Z-cut embodiments, wherein the electrodes 140/142 lie directly over the interferometer arms 126/124. Secondly, the buffer layer 150 is used to speed up the propagation of the RF modulation signal so that the optical wave and the microwave propagate with nearly equal phase velocities, thus increasing the interaction length, and as a result, increasing modulation bandwidth and/or efficiency at high modulation frequencies.

Various solutions to prevent the DC-induced bias drift have been proposed. For example, for X-cut $LiNbO_3$ modulators, it has been proposed to provide a separate low-frequency bias electrode structure 270, optically in series with an RF electrode structure 240, as illustrated in FIG. 2. A buffer layer 250 is provided below the RF electrode structure 240, to provide velocity matching, but is eliminated below the bias electrode structure 270, to reduce the DC drift. Conveniently, since the bias electrode structure 270 is deposited directly on the substrate, the required drive (bias) voltage is significantly reduced. Unfortunately, to accommodate both electrode structures, the length of the modulator has to be significantly increased. In addition, it is not ideal to locate the waveguides directly below the bias electrodes, because the highly conductive bias electrode material (e.g., Au) may introduce significant optical loss.

In Z-cut $LiNbO_3$ modulators, the DC-induced bias drift has been reduced by modifying the buffer layer. For example, in U.S. Pat. Nos. 5,404,412 and 5,680,497, the effect of the buffer layer charging in optical modulators is reduced by doping the buffer layer, causing it to be more conductive. The added conductivity in essence shorts out the buffer layer, preventing the buffer layer from charging up and offsetting all of the applied voltage from the waveguides. Accordingly, a DC or slowly varying voltage applied to the signal electrode is able to control the bias point of the modulator over time.

Unfortunately, it can be difficult to quantitatively control the introduction of the doping elements with a high reproducibility at the small concentrations required. Furthermore, water may be absorbed by the conductive buffer layer, changing its properties. In addition, the required drive, or bias voltage may be relatively high because the generated electric field must pass through the conductive buffer layer, which may be quite thick for Z-cut configurations.

In US Patent Application Publication No. 2003/0133638, the DC-induced bias drift is reduced by implanting a $SiO_2$ buffer layer with fluorine ions. The negative fluorine ions (F−) are believed to react with positive ions, such as lithium (Li+) from the substrate, to form stable compounds such as LiF. The reduction in the number of mobile Li+ ions then results in a reduction of the DC drift. Again, the required drive voltage may be relatively high, because the generated electric field must pass through the ion-implanted buffer layer, which may be quite thick for Z-cut configurations.

In US Patent Application Publication No. 2006/0023288 and U.S. Pat. No. 7,127,128, the DC-induced bias drift is reduced by providing a separate low-frequency bias electrode structure aligned with an overlying RF electrode structure. For example, consider the prior art X-cut embodiment illustrated in FIGS. 3A and 3B, wherein a dielectric buffer layer 350 is provided on a substrate 310 below an RF electrode structure 340/342/344, to provide velocity matching, but is eliminated below a bias electrode structure 370/372/374, to reduce the DC-induced bias drift. Unfortunately, using this structure with Z-cut electro-optical crystals results in increased optical loss, because in Z-cut crystals, the waveguides 324, 326 would have to be disposed directly under the bias electrodes 370, 372.

To reduce the optical loss, it has been proposed to dispose an additional buffer layer between the buried electrodes and the optical waveguide. For example, U.S. Pat. No. 7,844,149 discloses optical modulators having buried bias electrodes, in which a dielectric buffer underlayer is used to reduce optical loss.

US Patent Application Publication No. 2006/0023288 also describes buried-electrodes embodiments for Z-cut $LiNbO_3$ modulators. Referring to FIGS. 4A and 4B, the Z-cut embodiments typically include two bias signal electrodes, each of which is split into two separate elongated segments. More specifically, each segment of each split bias electrode 470/476 is shifted laterally to an opposite side of a corresponding waveguide segment 426/424. Again, a dielectric buffer layer 450 is provided over a substrate 410 below a bleed layer 460 and an RF electrode structure 440, 442, 444, to provide velocity matching, but is eliminated below a bias electrode structure 470, 472, 474, 476, to reduce the DC-induced bias drift.

Two problems were discovered experimentally with buried bias electrodes disclosed in US Patent Application Publication No. 2006/0023288 and in U.S. Pat. No. 7,844,149. The first problem is that mechanical stress varies over temperature. The mechanical stress of the bias electrodes 470/476 causes an refractive index change due to the (1) elasto-optic effect and (2) piezoelectric effect followed by electro-optic effect, which cause a shift in the bias point over temperature. Unfortunately, it is difficult to match the mechanical stress created by the two identical bias signal electrodes over temperature. In particular, the split bias electrodes 470/476 shown in FIGS. 4A and 4B caused a large shift in the bias point with temperature. The second problem is that the optical loss is increased due to the small but significant conductivity of the bias electrodes 470/476 in close proximity to the waveguide.

Another well-known general problem of prior-art modulators relates to humidity resistance. The combination of high magnitude electric fields and high humidity often results in electro-migration corrosion. In addition, when a metal adhesion layer (e.g., Ti, Ti/W, Cr, etc) is used to promote adhesion between an RF electrode (e.g., Au) and an electro-optic substrate (e.g., $LiNbO_3$), any moisture in direct contact with the multi-layer structure will serve as an electrolyte that induces galvanic corrosion.

Galvanic corrosion, which results from the difference in electrochemical potentials of dissimilar metals, can create a conductive deposit between the surface RF electrodes. The conductive deposit causes current leakage, short circuit, or peeling of the RF electrodes. Various schemes have been proposed to obviate the galvanic corrosion, and thus reduce the need for a hermetic package. For example, in U.S. Pat. No. 6,867,134 the adhesion layer is eliminated, whereas in US Patent Application Publication No. 2003/0062551 the adhesion layer is encapsulated. Alternatively, the adhesion layer can be made of a thin metal, such as nickel, which has a work function similar to gold. While these methods do suppress galvanic corrosion, electro-migration corrosion can still occur.

Electro-migration corrosion occurs when a large DC voltage is applied across closely spaced electrodes (e.g., gold RF electrodes) in the presence of water or at a high humidity level. Similar to galvanic corrosion, electro-migration corrosion negatively impacts the performance and reduces the service life of electro-optic devices. As a result, electro-optic devices are often coated as shown in U.S. Pat. No. 6,560,377 and/or sealed in hermetic packages.

The use of a coating is attractive because the modulator structure does not need to be modified dramatically to accommodate it. The coating has little impact on optical performance. A slight modification of electrode geometry, e.g., height, gap, might be required to compensate for a slight increase in the microwave refractive index caused by the dielectric properties of the coating. However, the coating can crack and/or delaminate due to a difference in thermal expansion coefficients of the coating materials and the electrodes being coated. Cracked and/or delaminated coating allows the moisture to penetrate the device, which causes corrosion and subsequent device failure.

In US Patent Application Publication No. 2006/0023288, the humidity tolerance is increased in various ways. In some embodiments, the large DC voltage is applied to bias electrodes that are disposed beneath a buffer layer, whereas in other embodiments the large DC voltage is applied to bias electrodes that are disposed below the substrate. Since these buried bias electrodes are protected from humidity, electro-migration corrosion of the buried bias electrodes is reduced.

The prior-art solutions to DC drift and humidity resistance problems rely on complex bias electrode and/or complex layer structures. In many prior-art modulators, using buried bias electrodes inevitably resulted in an increased optical loss. It would be advantageous to provide an electro-optical device with reduced DC drift and moisture sensitivity without the excessive layer complexity and/or optical loss penalty. Accordingly, it is a goal of the present invention to provide such a device.

SUMMARY OF THE INVENTION

In one embodiment of the invention, the RF signal electrode is used as a bias ground electrode. Thus, for Z-cut electro-optic crystals, there is no need to place a buried bias electrode under the RF signal electrode and over the optical waveguide. As a result, both optical and the RF wave propagation losses are reduced. Since the RF signal electrode is used as a bias ground electrode, its potential is zero, which improves humidity resistance as well. In another embodiment, a buried bias electrode is placed over the optical waveguide between two buffer layers having different electrical conductivity. The buffer layer on top of the buried bias electrode has a smaller electrical conductivity than the buffer layer below the buried bias electrode. This reduces voltage drops due to leakage currents.

In accordance with the invention there is provided an electro-optic device comprising:
a substrate having an optical waveguide formed therein;
an RF electrode structure for generating an RF electric field in an active section of the optical waveguide, the RF electrode structure including an RF signal electrode and at least one RF ground electrode, wherein the RF signal electrode is substantially parallel to the active section of the optical waveguide and is disposed above the active section of the optical waveguide;
a buffer layer between the signal RF electrode and the optical waveguide, disposed over the substrate in at least a partial contact therewith; and
a bias electrode structure for generating a biasing electric field in the active section of the optical waveguide, the bias electrode structure comprising a bias signal electrode disposed substantially parallel to the active section of the optical waveguide and adjacent to one side of the active section of the optical waveguide, wherein the bias electrode structure is free of electrodes at least partially disposed directly under the RF signal electrode, whereby the biasing electric field is generated in the active section of the optical waveguide by the first bias signal electrode with the RF signal electrode as a bias ground electrode.

In accordance with another aspect of the invention there is provided a method of fabricating an electro-optic device, comprising:
providing a substrate having an optical waveguide formed therein;
forming a bias electrode layer on the substrate, wherein the first bias electrode layer is patterned to include a first bias signal electrode adjacent to a section of the optical waveguide, the first bias signal electrode being disposed substantially parallel to the section of the optical waveguide, to one side of the section of the optical waveguide;
forming a buffer layer on the bias electrode layer; and
forming an RF electrode layer above the buffer layer, the RF electrode layer patterned to include an RF signal electrode adjacent to the section of the optical waveguide, the RF signal electrode being disposed above the section of the optical waveguide and to one side of the first bias electrode, so that the RF signal electrode does not overlap the patterned first bias electrode layer.

In one embodiment, the bias electrode is disposed not under but over the buffer layer, to reduce leakage currents.

In accordance with another aspect of the invention there is further provided an electro-optic device comprising:
a substrate having an optical waveguide formed therein;
a first buffer layer supported by the substrate;
a second buffer layer disposed over the first buffer layer in at least a partial contact therewith, wherein the second buffer layer is less conductive than the first;
an RF electrode structure for generating an RF electric field in an active section of the optical waveguide, the RF electrode structure including an RF signal electrode and at least one RF ground electrode, wherein the RF signal electrode is substantially parallel to the active section of the optical waveguide and is disposed over the second buffer layer and above the active section of the optical waveguide; and
a bias electrode structure disposed between the first and the second buffer layers, for generating a biasing electric field in the optical waveguide, the bias electrode structure comprising:
a bias signal electrode disposed between the RF signal electrode and the active section of the optical waveguide, substantially parallel to the active section of the optical waveguide, and
a first bias ground electrode disposed to one side of the active section of the optical waveguide,
whereby the biasing electric field is created across the active section of the optical waveguide when a voltage is applied between the bias signal electrode and the first bias ground electrode.

In accordance with yet another aspect of the invention there is provided a method of fabricating an electro-optic device, comprising:
providing a substrate having an optical waveguide formed therein;
forming a first buffer layer on the substrate, the first buffer layer having a first conductivity;
forming a bias electrode layer on the first buffer layer, wherein the first bias electrode layer is patterned to include:

a bias signal electrode adjacent to a section of the optical waveguide, the first bias signal electrode being disposed directly above the section of the optical waveguide, substantially parallel to the section of the optical waveguide, and a first bias ground electrode disposed to one side of the section of the optical waveguide;

forming a second buffer layer on the patterned first bias electrode layer, the second buffer layer having a second conductivity lower than the first; and forming an RF electrode structure for generating an RF electric field in the section of the optical waveguide, the RF electrode structure including an RF signal electrode adjacent to the section of the optical waveguide, and at least one RF ground electrode, wherein the RF signal electrode is substantially parallel to the section of the optical waveguide and is disposed over the second buffer layer and directly above the section of the optical waveguide.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art. In FIGS. 5 to 12, similar numerals refer to similar elements.

Figure 1A:
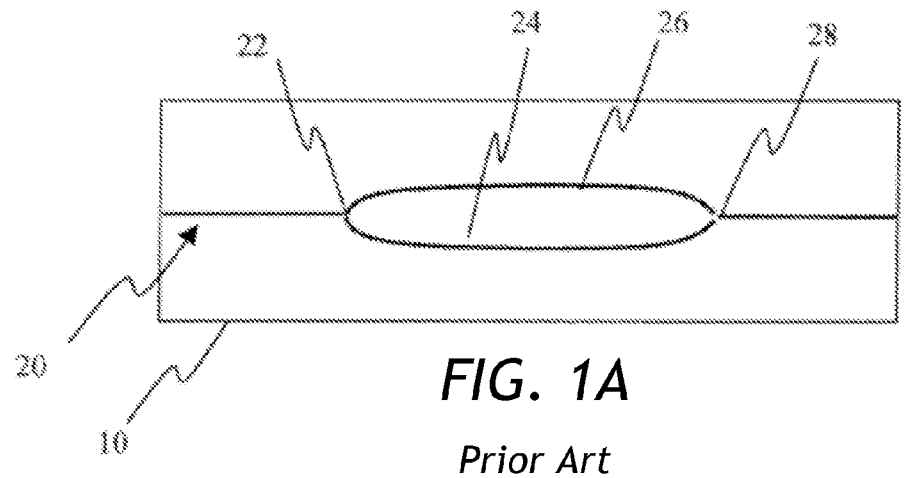
FIG. 1A is a schematic diagram of a prior art Mach-Zehnder optical modulator, illustrating a common optical waveguide configuration.
Figure 1B:
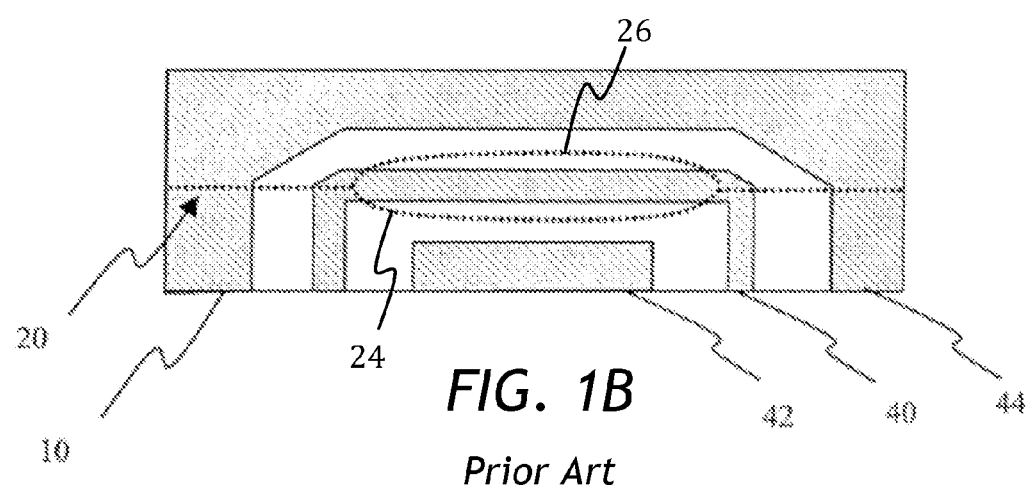
FIG. 1B is a schematic diagram of a prior art Mach-Zehnder optical modulator, illustrating a common electrode configuration for X-cut $LiNbO_3$.
Figure 1C:
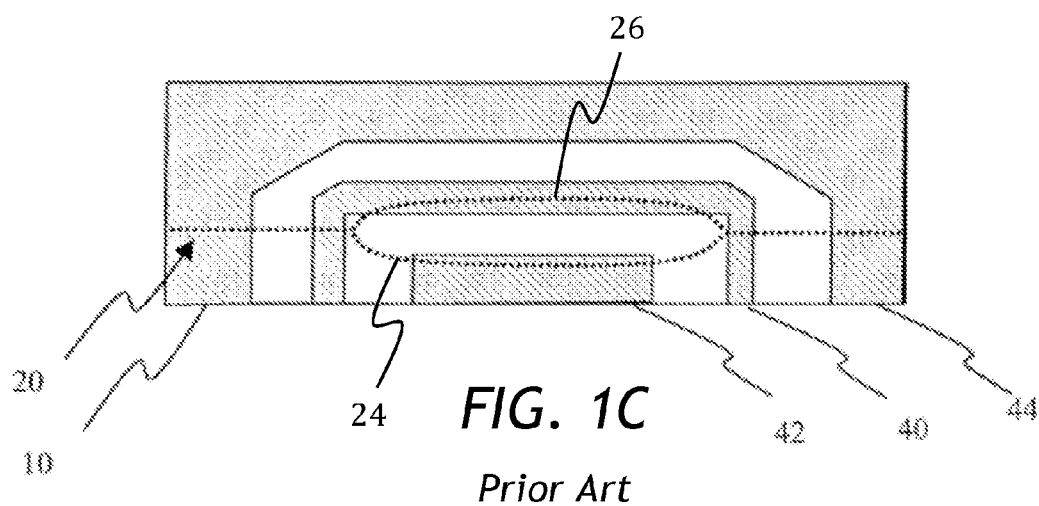
FIG. 1C is a schematic diagram of a prior art Mach-Zehnder optical modulator, illustrating a common electrode configuration for Z-cut $LiNbO_3$.
Figure 1D:
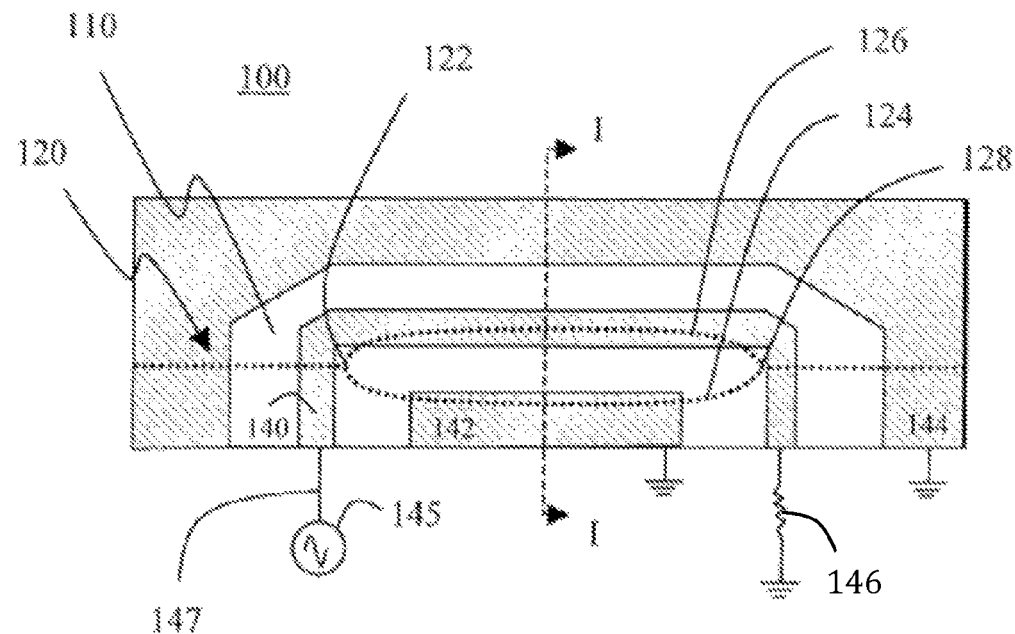
FIG. 1D is a plan view of a prior art Mach-Zehnder optical modulator having a Z-cut $LiNbO_3$ substrate.
Figure 1E:
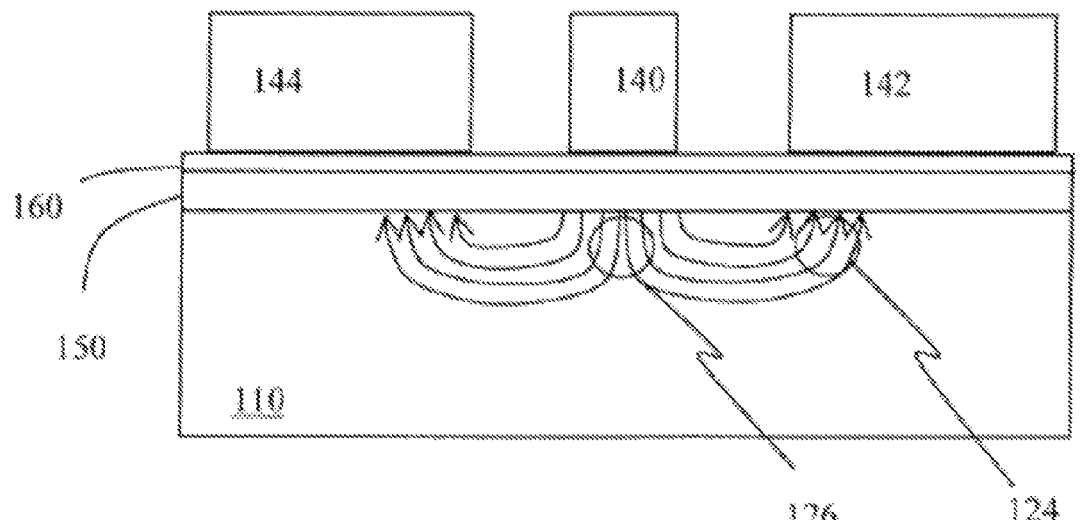
FIG. 1E is a sectional view of the prior art Mach-Zehnder optical modulator illustrated in FIG. 1D, taken along line I-I.
Figure 2:
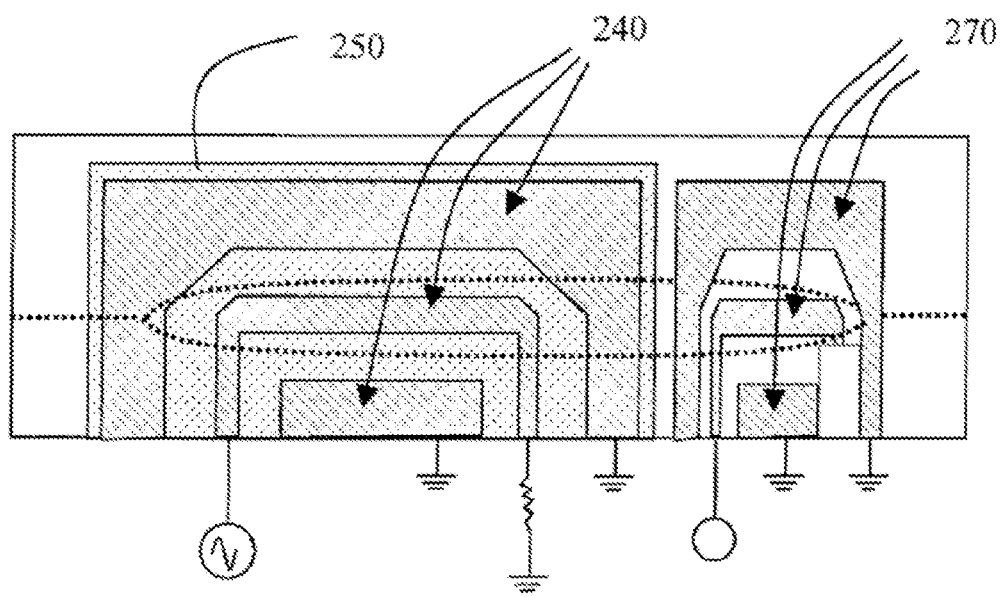
FIG. 2 is a plan view of a prior art low bias drift Mach-Zehnder optical modulator having an X-cut $LiNbO_3$ substrate.
Figure 3A:
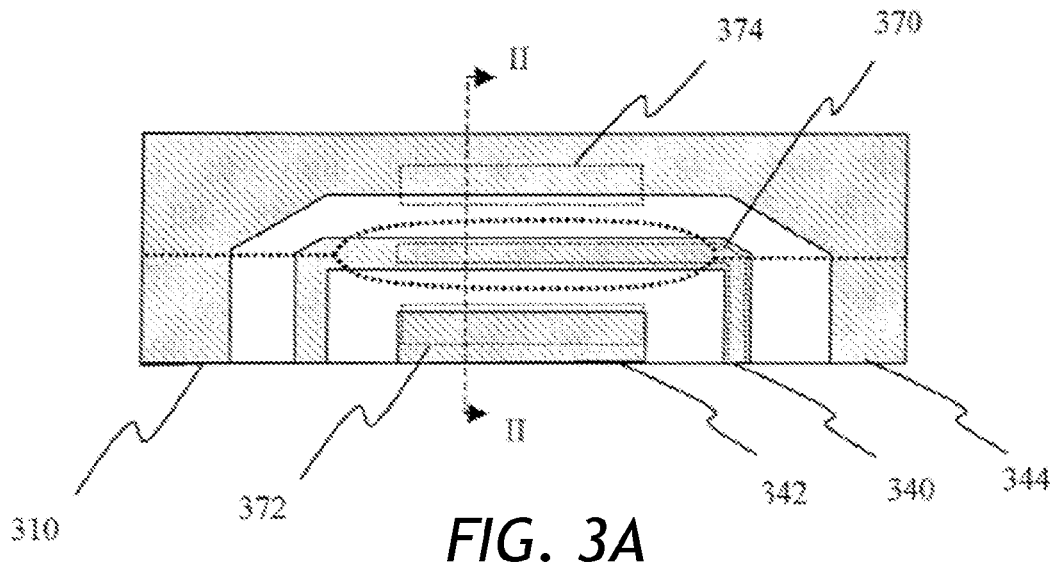
FIG. 3A is a plan view of another prior art low bias drift Mach-Zehnder optical modulator having an X-cut $LiNbO_3$ substrate.
Figure 3B:
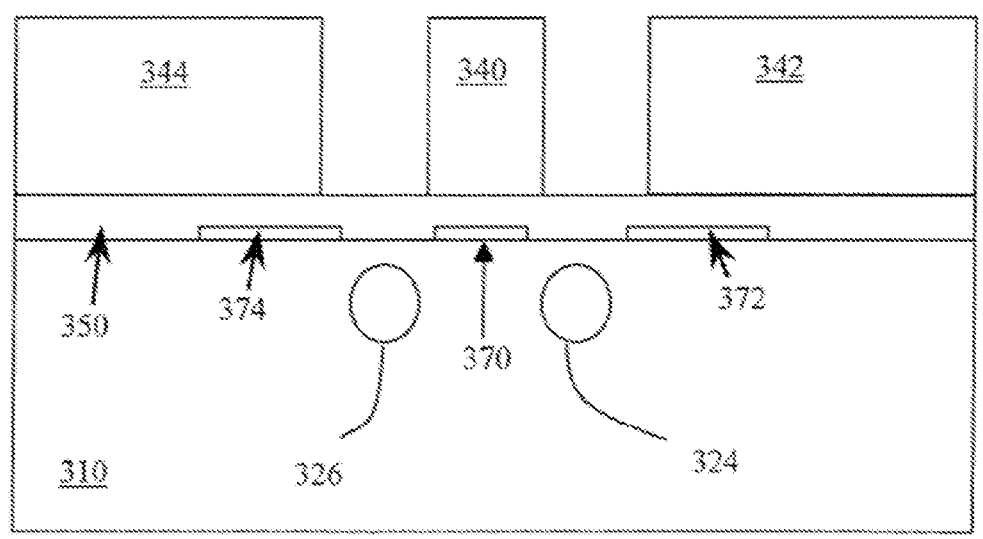
FIG. 3B is a sectional view of the prior art Mach-Zehnder optical modulator illustrated in FIG. 3A, taken along line II-II.
Figure 4A:
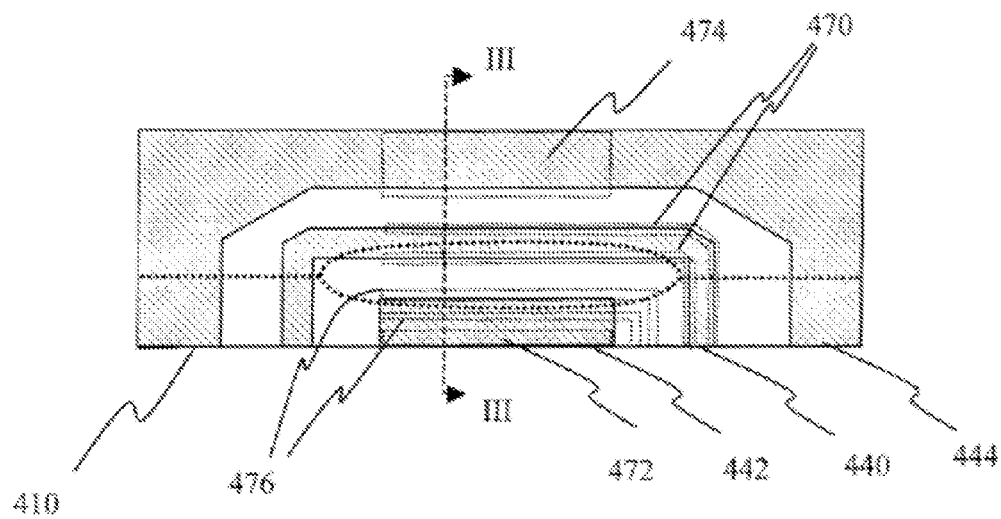
FIG. 4A is a plan view of a prior art low bias drift Mach-Zehnder optical modulator having a Z-cut $LiNbO_3$ substrate.
Figure 4B:
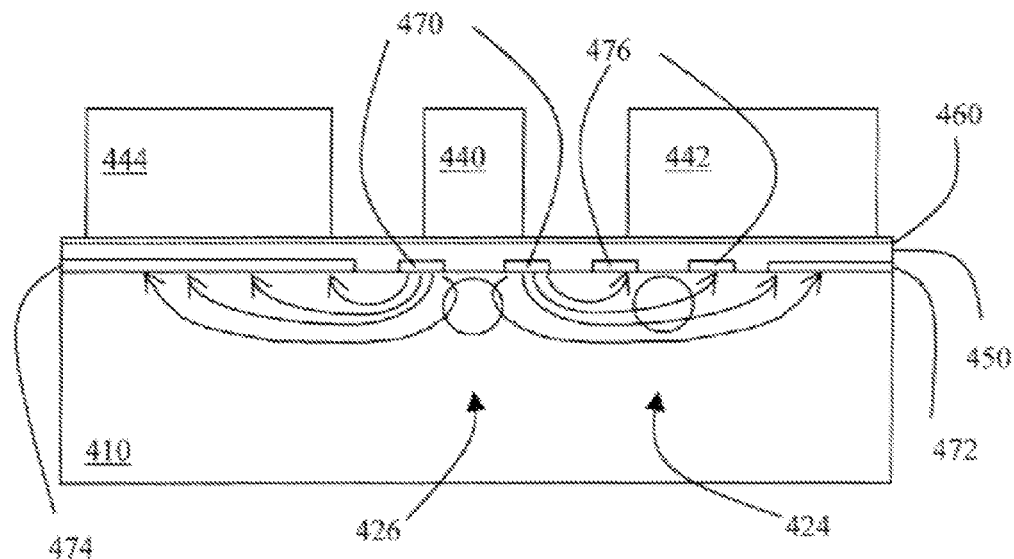
FIG. 4B is a sectional view of the prior art Mach-Zehnder optical modulator illustrated in FIG. 4A, taken along line III-III.
Figure 5:
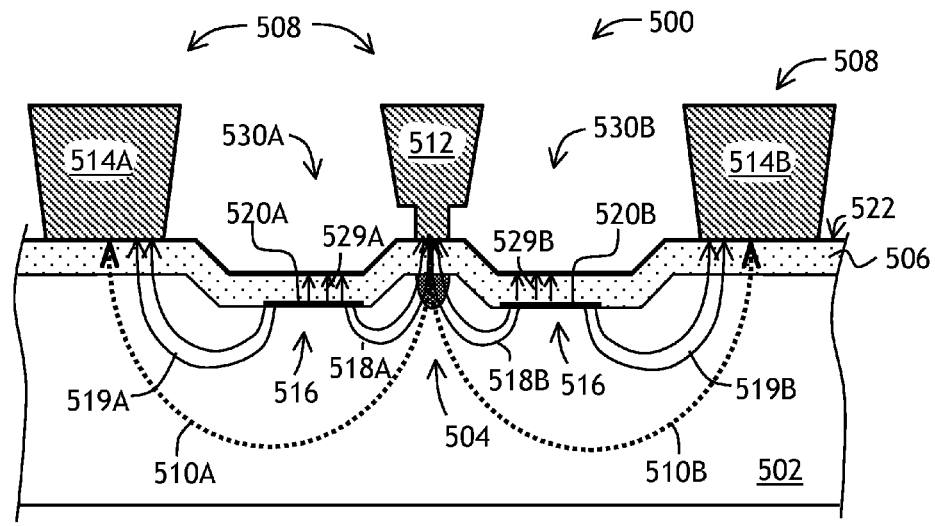
FIG. 5 is a cross-sectional view of an optical modulator according to one embodiment of the invention.

Referring to FIG. 5, an optical modulator 500, according to the present invention, includes a Z-cut electro-optical crystal substrate 502, e.g. $LiNbO_3$ or other suitable material, having an optical waveguide 504 formed therein, a buffer layer 506 disposed over the substrate 502 in at least a partial contact with the substrate 502, an RF electrode structure 508 disposed over the buffer layer 506, and a buried bias electrode structure 516 disposed on the substrate 502 under the buffer layer 506. The RF electrode structure 508 includes a shaped RF signal electrode 512 disposed substantially parallel to and directly above an active section of the optical waveguide 504, and two RF ground electrodes 514A and 514B. Herein, the term "active section" means a section of the optical waveguide 504 that is used for RF modulation of light propagating in the optical waveguide 504. The bias electrode structure 516 includes bias signal electrodes 520A and 520B disposed substantially parallel to the active section of the optical waveguide 504, and adjacent to and on opposite sides of the active section of the optical waveguide 504 at a bottom of slots 530A, 530B in the substrate 502. The slots 530A, 530B are typically 10 to 60 micrometers wide, and 3 to 10 micrometers deep. The width of the bias signal electrodes 520A and 520B is within the width range of the slots 530A, 530B, covering 10% to 90% of the bottom area of the slots 530A, 530B. The bias signal electrodes 520A and 520E are spaced apart laterally and disposed vertically below the RF signal electrode 512. According to the invention, the RF signal electrode 512 is used as a bias ground electrode. Using the RF signal electrode 512 as a bias ground electrode obviates the need for bias electrodes at least partially disposed directly under the RF signal electrode 512. The optical modulator 500 also includes an optional bleed layer 522 supported by the buffer layer 506 and disposed below the RF signal electrode 512, in electrical contact with the RF signal electrode 512 and the first and second RF ground electrodes 514A and 514B, for removal of electrical charges causing DC drift. Some examples of suitable materials for the bleed layer 522 include tantalum silicon nitride (TaSiN), titanium silicon nitride (TiSiN), silicon titanium oxynitride (SiTiON), amorphous or polycrystalline silicon (Si), etc. The thickness of the bleed layer 522 is typically in the range between about 0.05 and 0.5 micrometers, and more commonly between about 0.05 and 0.25 micrometers. The material TaSiN typically has a bulk resistivity in the range of about ~$10^4$ to $10^6$ Ω-cm at 25° C. A wider range of resistivity of the bleed layer 522, for example $10^2$ to $10^8$ Ω-cm, is also acceptable. The slots 530A and 530B in the substrate 502 and the shaped RF signal electrode 512 are optional features. These features facilitate improving modulation efficiency and reducing a required amplitude of the drive voltage for the modulator 500. The second ground electrode 514B and the second bias signal electrode 520B are also optional, although their use increases the strength of the electric fields through the optical waveguide 504.

In operation, the RF electrode structure 508 generates an RF electric field 510A, 510B in the active section of the optical waveguide 504, thus modulating an optical signal propagating in the optical waveguide 504 due to an electro-optic (Kerr) effect. The bias signal electrodes 520A, 520B create a biasing electric field 518A, 518B in the optical waveguide 504 when the RF signal electrode 512 is used as a bias ground electrode.

In this embodiment, a non-zero bias voltage is applied to the bias signal electrodes 520A and 520B. The RF signal electrode 512 is maintained at 0V, or ground bias potential. Hence, there is no DC voltage applied across the RF electrode structure 508. However, the buried bias electrodes 520A, 520B do receive a voltage. The electric field lines 518A, 518B run from the signal bias electrodes 520A, 520B at the bottom of the trenches 530A, 530B, respectively, through the substrate 502, through the optical waveguide 504, through the buffer layer 506, and to the RF signal electrode 512. The field lines 518A, 518B travel through the buffer layer 506, therefore it is important for the buffer layer 506 to have at least a small amount of bulk conductivity approximately matched to that of the substrate 502, for example between $10^{-19}$ and $10^{-16}$ $(\Omega\text{-cm})^{-1}$ for a lithium niobate substrate, to prevent build up of space charges at the boundary between the buffer layer 506 and the substrate 502, which would create an electric field that cancels the applied bias electric fields 518A, 518B. Note that another set of field lines 519A, 519B run from the outside edge of the bias signal electrodes 520A, 520B to the RF ground electrodes 514A, 514B, respectively. These field lines are not of any consequence in the optical modulator 500, because there are no waveguides underneath the RF ground electrodes 514A, 514B. It is preferable that the bias signal electrodes 520A, 520B are shifted towards the optical waveguide 504, while remaining in the trenches 530A, 530B, to increase the bias electric fields 518A, 518B going through the optical waveguide 504, while reducing the bias electric fields 519A, 519B going towards the RF ground electrodes 514A, 514B, respectively.

An electric field is also created between bias signal electrodes 520A, 520B and the bleed layer 522, as shown with electrical lines 529A and 529B, respectively. One potential issue with the optical modulator 500 is the leakage current associated with the field lines 529A and 529B. If large enough, this leakage current could cause a voltage drop down the length of the buried bias electrodes 520A, 520B, reducing the modulation efficiency of the bias electrodes 520A, 520B. To keep the leakage current within reasonable limits, the conductivity of the buffer layer 506 is preferably kept below $10^{-12}$ $(\Omega\text{-cm})^{-1}$, although the above-mentioned conductivity range of $10^{-19}$ and $10^{-16}$ $(\Omega\text{-cm})^{-1}$ is acceptable.

Figure 6:
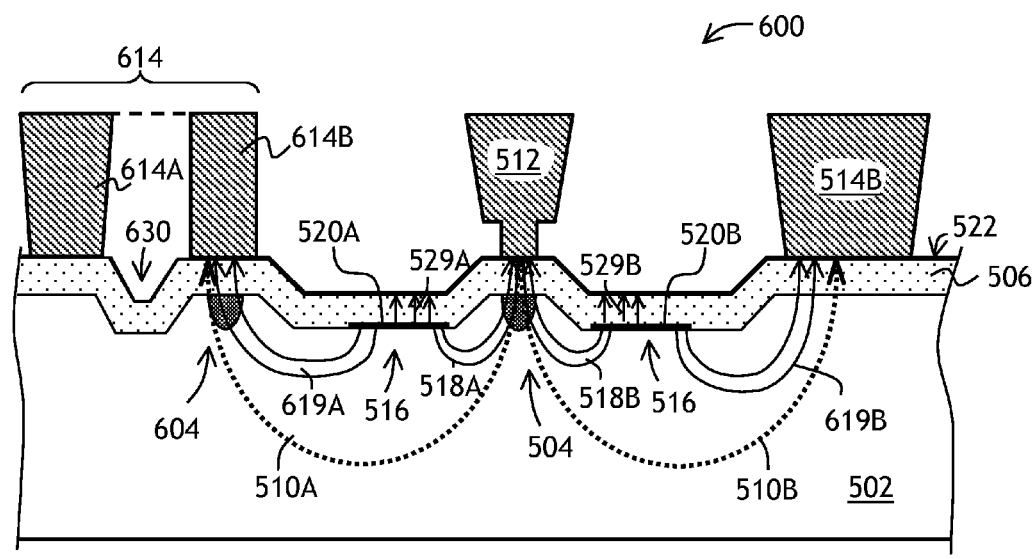
FIG. 6 is a cross-sectional view of an Mach-Zehnder optical modulator of the invention, having a split ground electrode.

Referring now to FIG. 6, an optical modulator 600 includes an optical waveguide 604 under a part 614B of a split ground RF electrode 614. A slot 630 separates a part 614A of the split ground electrode 614 from its part 614B. The RF electrodes 512, 614, and 514B operate to create an optical path difference between the waveguides 504 and 604. The rest of the construction of the optical modulator 600 is analogous to that of the optical modulator 500 of FIG. 5.

In operation, four sets of electric field lines are created by the RF electrodes 512, 614, and 514B: (1) one set 518A, 518B from the inside portion of the bias electrodes 520A, 520B to the RF signal electrode 512, (2) one set 619A from the outside portion of the bias electrodes 520A to the RF ground electrode 614B through the second waveguide 604, (3) one set 619B from the outside portion of the bias electrodes 520B to the RF ground electrode 514B, and (4) one set 529A, 529B from the top of each bias signal electrode through the buffer layer 506 to the bottom of the bleed layer 522. Unfortunately, in the optical modulator 600, the field lines 518A, 518B, and 619A travel the same direction through both waveguides 504 and 604, respectively, causing some cancellation of the modulation, because it is the difference in phase change between the two waveguides that causes the bias point of the Mach-Zehnder modulator to shift with voltage. Fortunately, the modulation efficiency for the waveguide 604 underneath the ground electrode 614B is much weaker, by approximately a factor of 4, compared to the modulation efficiency for the waveguide 504 underneath the RF signal electrode 512. This reduction of modulation efficiency occurs due to the much larger footprint of the RF ground electrode 614B as compared to the footprint of the RF signal electrode 512.

Figure 7:
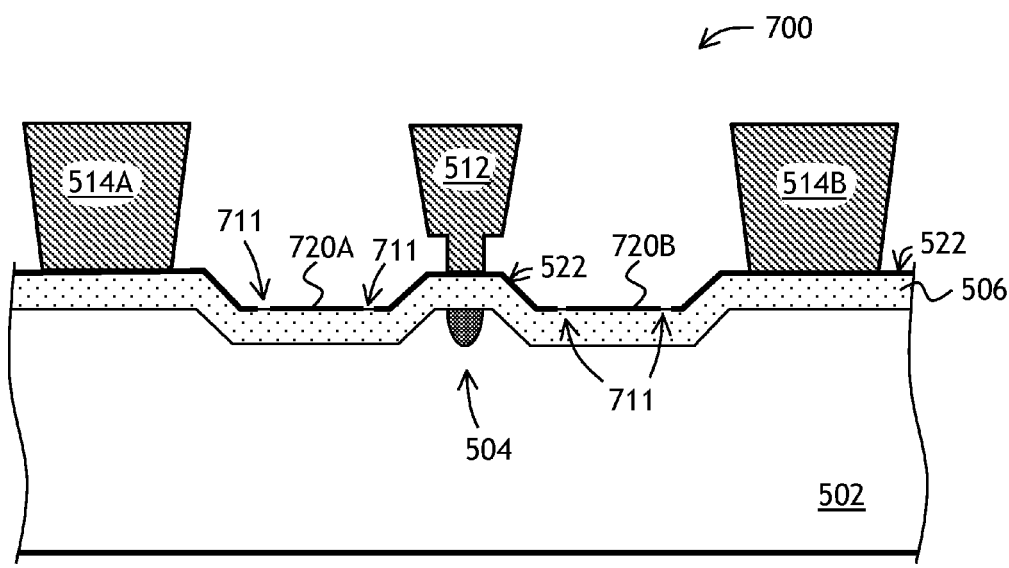
FIG. 7 is a cross-sectional view of an optical modulator of the invention, having a bias electrode above a buffer layer.

Turning to FIG. 7, an optical modulator 700 represents another embodiment of the invention. In the optical modulator 700, the leakage current between bias signal electrodes 720A, 720B and the bleed layer 522 is eliminated by placing the bias signal electrodes 720A, 720B on the buffer layer 506. Note that in this case, the bias signal electrodes 720A, 720B are no longer buried, and will be exposed to humidity. Fortunately, the bias signal electrodes 720A, 720B, ideally made of TaSiN or other suitable material, have been found to be tolerant of moisture. In this case, the bias signal electrodes 720A, 720B also function as a bleed layer, to bleed off pyroelectric charges created in the lithium niobate substrate 502. One drawback of the optical modulator 700 is that pyroelectric charges can accumulate in gaps 711 between the bias signal electrodes 720A, 720B and the bleed layer 522. Fortunately, those sites and any field created by the accumulated space charges are disposed far enough from the waveguide 504 not to induce a noticeable electric field in the waveguide 504. Notably, if the bias signal electrodes 720A, 720B and the bleed layer 522 are selected to have the same conductivity, they can be deposited in a single layer forming step, thus simplifying the fabrication process.

The optical modulator 700 can be manufactured as follows. The substrate 502 is provided having the optical waveguide 504 formed therein. Then, the buffer layer 506 is formed on the substrate 502. Then, a bleed layer is formed on the buffer layer 506, patterned to include the signal bias electrodes 720A and 720B disposed on opposite sides of the optical waveguide 504, adjacent to the active section of the optical waveguide 504 as shown in FIG. 7. An RF electrode layer is then formed above the bleed layer 522. The RF electrode layer is patterned to include the RF signal electrode 512 adjacent to the active section of the optical waveguide 504. The RF signal electrode is disposed above the active section of the optical waveguide 504 and between the bias electrodes 720A and 720B, so that the RF signal electrode 512 does not overlap the patterned first bias electrode layer. Only one bias signal electrode 720A can be used, the second one 720B is optional. The optional bleed layer 522 can be formed above the buffer layer 506. The bleed layer 522 can have the bulk resistivity between $10^2$ to $10^8$ $\Omega$-cm at 25° C. and the thickness of the bleed layer is commonly between about 0.05 and 0.25 micrometers. Advantageously, the bleed layer 522 and the bias electrodes 720A, 720B can be formed in a single layer forming step.

Figure 8:
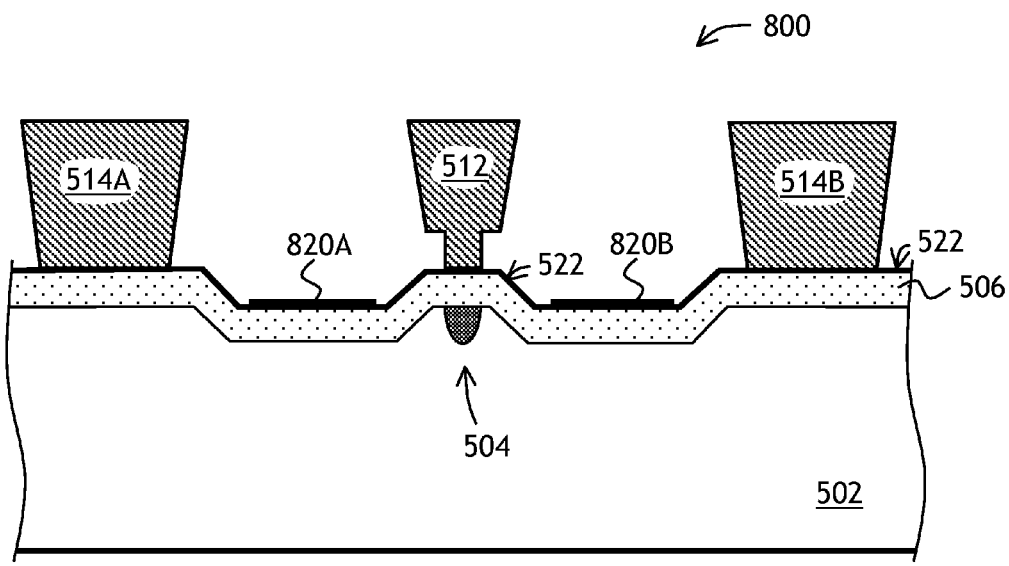
FIG. 8 is a cross-sectional view of an optical modulator of the invention, having the bias electrode formed of a same material as the bleed layer.

Turning now to FIG. 8, an optical modulator 800 is a variant of the optical modulator 700 of FIG. 7. In the optical modulator 800 of FIG. 8, the bleed layer 522 and bias signal electrodes 820A, 820B can be made of either different materials or out of the same material, but at different thicknesses. In the first case, the conductivity of the bias signal electrodes 820A, 820B is much smaller than that of gold, but much higher than that of the bleed layer 522, to ensure that a biasing voltage can be maintained on the bias signal electrodes 820A, 820B without any voltage drop due to the leakage currents into the bleed layer 522. The material of the bias signal electrodes 820A, 820B must be tolerant to moisture, even with a voltage applied to the bias signal electrodes 820A, 820B. As noted above, materials like TaSiN have been found to be tolerant of humidity. In the second case, the bleed layer 522 and the bias signal electrodes 820A, 820B can be made out of the same material, for example TaSiN, but the bias signal electrodes 820A, 820B are made much thicker, for example 5× to 10× thicker (limited by fabrication constraints), in order to increase its sheet conductivity in comparison to that of the bleed layer 522. Alternatively, the composition of the material, for example TaSiN, could be varied in order to increase the conductivity of the bias signal electrodes 820A, 820B relative to that of the bleed layer 522, for example by the factor of 10 to 100.

Figure 9A:
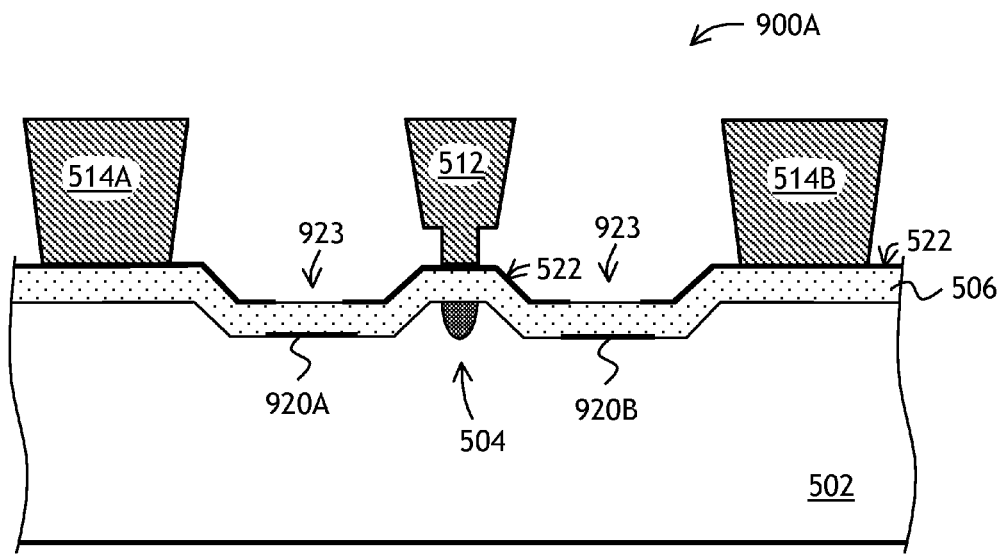
FIG. 9A is a cross-sectional view of an optical modulator according to an embodiment of the invention having a gap in the bleed layer.

Referring to FIG. 9A, an optical modulator 900A has bias signal electrodes 920A and 920B disposed underneath the buffer layer 506. To avoid leak currents between the bias signal electrodes 920A and 920B and the bleed layer 522, the bleed layer 522 has gaps 923 over the bias signal electrodes 920A and 920B, such that the bleed layer 522 only partially overlaps the bias signal electrodes 920A and 920B, to assure complete removal of pyroelectric charges. The width of the gaps 923 are typically 2 to 10 micrometers less than the width of the bias signal electrodes 920A and 920B. The rest of the construction of the optical modulator 900A is similar to that of the optical modulator 500 of FIG. 5.

Figure 9B:
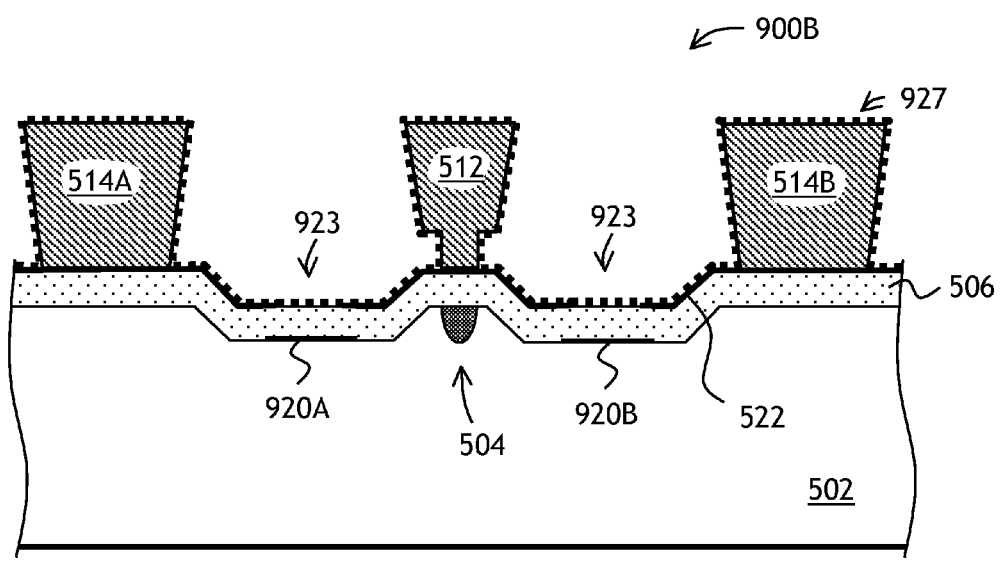
FIG. 9B is a cross-sectional view of an optical modulator of FIG. 9A, coated with a humidity-resistant coating.

Referring now to FIG. 9B, an optical modulator 900B is similar to the optical modulator 900A of FIG. 9A, with an exception that a coating 927, shown in thick dotted line, covers the RF electrodes 512, 514A, and 514B, the buffer layer 506, and the bleed layer 522. The coating 927 is used for additional protection against moisture. The coating 927 can be formed using atomic layer deposition. It can be made of TaSiN, or SiN, aluminum oxide, titanium oxide, or a combination of various materials. In the optical modulators 900A and 900B of FIGS. 9A and 9B, the buried bias electrodes 920A and 920B also function as a bleed layer, removing any pyroelectric charges. If the coating 927 is non-conductive, for example is made of SiN, then the leakage current from the bias signal electrodes 920A and 920B to the bleed layer 522 is substantially reduced, occurring only in the small overlap region where the bias signal electrodes 920A and 920B and the bleed layer 522 are close to each other.

Figure 10:
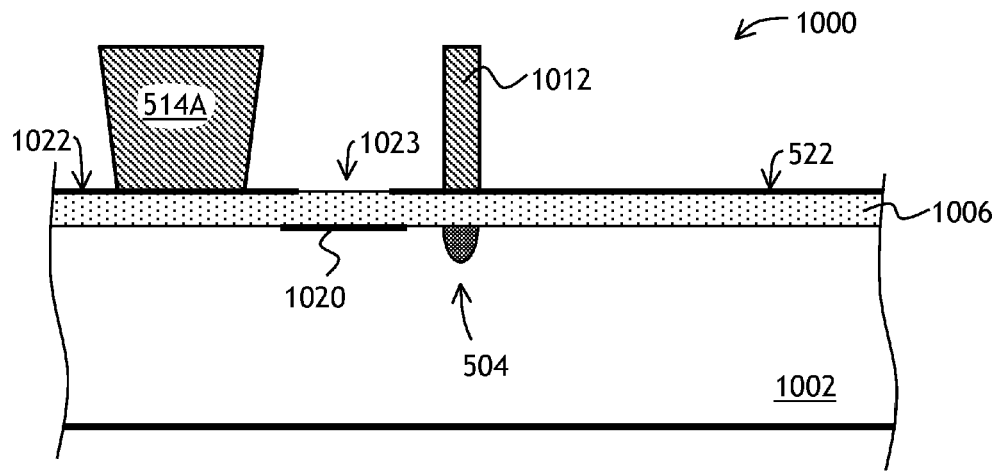
FIG. 10 is a cross-sectional view of an optical modulator of the invention, having a single bias electrode and a single RF ground electrode.

Turning to FIG. 10, an optical modulator 1000 is similar to the optical modulator 500 of FIG. 5, except that there is only one RF ground electrode 514A and one bias signal electrode 1020. In addition, the RF signal electrode 1012 is not shaped, and a substrate 1002 is not slotted to produce ridge waveguides. A moisture-resistant electrode coating is not applied either. The optical modulator 1000 has the optional bleed layer 522 on top of a buffer layer 1006. The bias signal electrode 1020 is disposed on the substrate 1002 under the buffer layer 1006. The bleed layer 522 has a gap or an opening 1023 over the bias signal electrode 1020, such that the bleed layer 522 only partially overlaps the bias signal electrode, at the edges thereof, as shown in FIG. 10. This embodiment illustrates that the invention is compatible with simpler, lower cost structures that do not have shaped electrodes or the slotted substrate, as do the optical modulators 500, 600, 700, 800, 900A and 900B. One bias signal electrode 1020 is adequate in this case, though less efficient than symmetrically placed two bias signal electrodes. Advantageously, the optical modulator 1000 can have any suitable RF electrode geometry, for example, the "ground-signal-ground" geometry of the optical modulators 500, 600, 700, 800, 900A and 900B, or "ground-signal" geometry, which is sometimes referred to as Asymmetric Co-Planar Waveguide (ACPW), or even a microstrip geometry of the RF modulating electrodes.

The optical modulator 1000 can be manufactured as follows. The substrate 1002 is provided having the optical waveguide 504 formed therein. Then, a bias electrode layer is formed on the substrate 1002, patterned to include the bias signal electrode 1020, which is adjacent to a active section of the optical waveguide 504 and is disposed to one side of the optical waveguide 504, as shown in FIG. 10. Then, the buffer layer 1006 is formed on the bias electrode layer. An optional bleed layer 522 is deposited on top of the buffer layer 1006, and an opening 1023 is patterned in the bleed layer 522. An RF electrode layer is then formed above the buffer layer 1006. The RF electrode layer is patterned to include the RF signal electrode 1012, which is disposed adjacent to the active section of the optical waveguide 504, directly above the optical waveguide 504, and to one side of the bias electrode 1020, so that the RF signal electrode 1012 does not overlap the first bias electrode 1020.

The optical modulators 500, 600, 800, 900A and 900B, and 1200 can also be fabricated using the above method. For these modulators, additional steps of forming the bleed layer 522 and/or the trenches 530A and 530B will be needed.

The optical modulators 500, 600, 700, 800, 900A and 900B use Z-cut LiNbO$_3$ substrate 502, and the optical modulator 1000 uses Z-cut substrate 1002. However, the present invention is not limited to Z-cut geometries of modulators or other electro-optical devices. As is well known in the art, for Z-cut crystals, the RF signal electrodes 512 and 1012 are disposed directly above the optical waveguide 504, while for X-cut crystals, the RF signal electrodes 512 and 1012 are disposed above the optical waveguide 504, laterally shifted relative to the optical waveguide 504. Accordingly, the term "above" used herein to define position of a layer at a larger distance from the substrate 502 or 1002.

Figure 11:
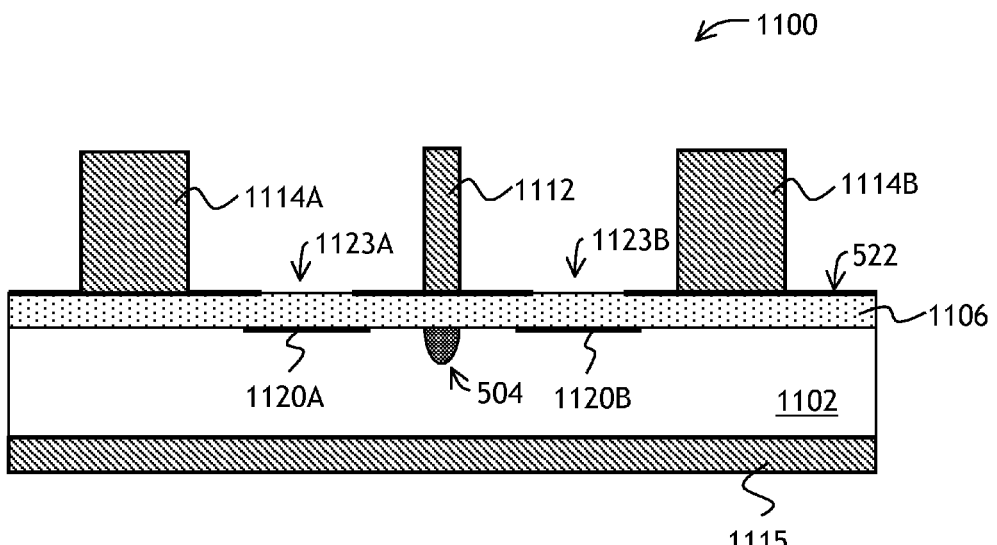
FIG. 11 is a cross-sectional view of an optical modulator of the invention, based on a microstrip RF waveguide.

Turning now to FIG. 11, an optical modulator 1100 has a microstrip geometry of RF modulating electrodes 1112, 1114A, 1114B, and 1115. An RF signal electrode 1112 is disposed on the top surface of a substrate 1102, and the main RF ground electrode 1115 is disposed on the back surface of the substrate 1102. The substrate 1102 is preferably between 10 and 100 micrometers thick. Buried bias signal electrodes 1120A and 1120B are disposed on the substrate 1102 under a buffer layer 1106. The bleed layer 522 has gaps 1123A and 1123B over the bias signal electrodes 1120A and 1120B, whereby the bleed layer 522 only overlaps the bias signal electrodes 1120A and 1120B at the edges thereof. RF ground electrodes 1114A and 1114B on top of the surface are optional, and may or may not be close to the RF signal electrode 1112. The RF field lines, not shown in FIG. 11, may terminate mainly on the main RF ground electrode 1115, or on all three ground electrodes 1115, 1114A, and 1114B. The RF ground side electrodes 1114A and 1114B on the lop surface can be provided to mechanically protect the thin RF signal electrode 1112, but may have an electrical function as well.

According to one embodiment of the invention, a bias signal electrode 1221 can be disposed directly over the optical waveguide 504, and directly under the RF signal electrode 512. In this embodiment, the bias signal electrode 1221 is disposed not on the substrate 502 but between two buffer layers of differing conductivity.

Figure 12:
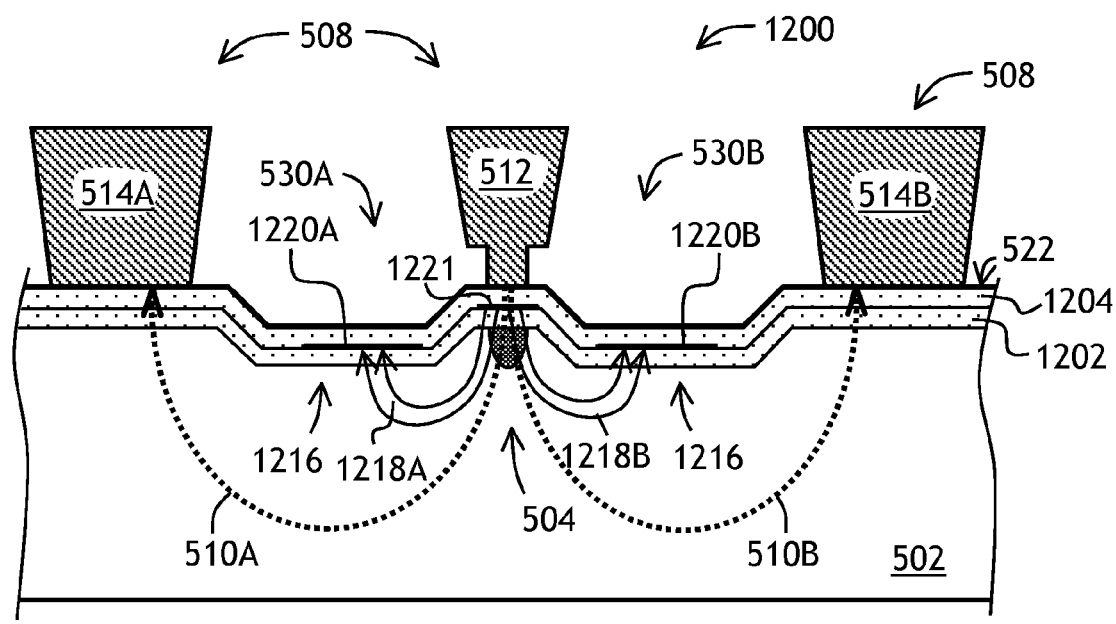
FIG. 12 is a cross-sectional view of an optical modulator according to another embodiment of the invention.

Referring to FIG. 12, an optical modulator 1200 includes the substrate 502 having the optical waveguide 504 formed therein, a first buffer layer 1202 supported by the substrate 502, a second buffer layer 1204 disposed over the first buffer layer 1202 in at least a partial contact with, and less conductive than the first buffer layer 1202, the RF electrode structure 508 for generating the RF electric field 510A, 510B in an active section of the optical waveguide 504, and a bias electrode structure 1216 disposed between the first 1202 and the second 1204 buffer layers, for generating a biasing electric field 1218A, 1218B in the active section of the optical waveguide 504. The RF electrode structure 508 includes the RF signal electrode 512 and two RF ground electrodes 514A and 514B. The RF signal electrode 512 is substantially parallel to the active section of the optical waveguide 504 and is disposed over the second buffer layer 1204 and directly above the active section of the optical waveguide 504. The bias electrode structure 1216 includes first 1220A and second 1220B bias ground electrodes and a bias signal electrode 1221. The optional bleed layer 522 is disposed on top of the second buffer layer 1204, for removal of electrical charges. The bleed layer 522 is disposed below the RF signal electrode 512, in electrical contact with the RF signal electrode 512 and the first 514A and second 514B RF ground electrodes.

In operation, a non-zero voltage is applied to the bias signal electrode 1221, while the bias ground electrodes 1220A and 1220B are kept at ground (0V) potential. Alternatively, opposite in sign, but equal in magnitude push-pull voltages could be applied to the signal and the ground bias electrodes 1221 and 1220A/1220B, respectively. The voltages do not have to be equal in magnitude; it is the voltage differential that will determine the strength of the electric field created in the waveguide 504. Not shown in FIG. 12 are field lines that run from the bias signal and/or ground electrodes 1221 and 1220A, 1220B, respectively, to the bleed layer 522, via the second buffer layer 1204, when a non-zero voltage is applied to the bias signal and/or ground electrodes 1221 and 1220A, 1220B. The relatively low conductivity of the second buffer layer 1204, which can be formed of undoped silicon dioxide, helps reduce the leakage currents associated with these field lines. The leakage currents cause a voltage drop along the length of the bias electrodes 1221, 1220A, 1220B if they become large enough, hence the conductivity of the bias electrodes 1221, 1220A, 1220B must be large enough to reduce such a voltage drop, yet small enough to introduce RF loss into the electrode structure. For example, the conductivity of the bias electrodes 1221, 1220A, 1220B can be between $10^4$ to $10^6$ Ω-cm at 25° C.

The optical modulator 1200 can be manufactured as follows. At a first step, the substrate 502 is provided having an optical waveguide formed therein. Then, the first buffer layer 1202 is formed on the substrate 502. Then, a bias electrode layer is formed on the first buffer layer 1202. The first bias electrode layer is patterned to include the bias signal electrode 1221 disposed directly above and substantially parallel to the optical waveguide 504, The first and the second bias ground electrodes 1220A and 1220B are then disposed on opposite sides of the active section of the optical waveguide 504. Then, the second buffer layer 1204 is formed on the patterned first bias electrode layer. The conductivity of the second buffer layer 1204 is lower than the conductivity of the first buffer layer 1202. The layers can be formed, for example, by sputter deposition of silicon dioxide with different doping levels of indium, tin, and/or other elements. One skilled in the art knows how to vary the material composition by using sputtering targets of different composition, or using a Chemical Vapor Deposition (CVD) process in which the material composition can be varied at will. Then, an RF electrode structure 508 is formed, including the RF signal electrode 512 and the two RF ground electrodes 514A and 514B, so that the RF signal electrode 512 is substantially parallel to the active section of the optical waveguide 504 and is disposed over the second buffer layer 1204 and directly above the active section of the optical waveguide 504. Only one RF ground electrode 514A and only one bias ground electrode 1220 A may be formed, to produce an asymmetric RF waveguide as noted above. Furthermore, the bleed layer 522 and the trenches 530A and 530B are optional, being formed in corresponding optional steps.

Other embodiments of optical modulators and other electro-optical devices are possible. For instance, RF electrodes of the optical modulators 500, 600, 700, 800, 900A and 900B, 1100, and 1200 can form an ACPW, having only one RF signal electrode with only one RF ground electrode. The embodiments could also be used in substrates not having slots, or RF signal electrodes that are not shaped, for simplicity of manufacturing. The optical modulators 500, 600, 700, 800, 900A and 900B, 1100, and 1200 typically use materials suitable for a configuration where the optical waveguide is under the RF electrodes. For example, Z-cut lithium niobate can be used. Other electro-optic materials such as polymers, or semiconductors (for example, InP, GaAs), can be used as well.

Advantageously, since the bias signal electrodes 520A, 520B, 720A, 720B, 820A, 820B, 920A, 920B, 1120A, and 1120B are disposed within the inter-electrode gaps between the corresponding RF signal electrodes 512, 1012, 1112 and ground electrodes 514A, 514B, 1114A, 1114B, and away from the waveguide 504, they can be fabricated relatively wide. For example, in one embodiment, the bias signal electrodes 520A, 520B, 720A, 720B, 820A, 820B, 920A, 920B, 1120A, and 1120B are 20 micrometers wide. In general, the bias electrodes will be between 5 micrometers and 50 micrometers wide, and more commonly between 10 micrometers and 30 micrometers wide. Providing relatively wide bias signal electrodes 520A, 520B, 720A, 720B, 820A, 820B, 920A, 920B, 1120A, and 1120B improves efficiency and simplifies the fabrication process. Furthermore, providing relatively wide bias signal electrodes 520A, 520B, 720A, 720B, 820A, 820B, 920A, 920B, 1120A, and 1120B significantly reduces mechanical stress, and, consequently, mechanical damage due to the mechanical stress accumulated over time.

Furthermore, since the bias signal electrodes 520A, 520B, 720A, 720B, 820A, 820B, 920A, 920B, 1120A, and 1120B are not disposed over any optical waveguide, optical loss is significantly reduced.

Further advantageously, since the RF signal electrodes 512, 1012, and 1112 function as a bias ground electrode, the fabrication process is significantly simplified.

In embodiments where the bias signal electrodes 520A, 520B, 720A, 720B, 820A, 820B, 920A, 920B, 1120A, 1120B, and 1221 are formed from high resistivity materials, the RF signal will advantageously be less likely to couple with bias electrodes, and the net RF loss per unit length of the RF signal electrode will decrease accordingly. In particular, using relatively high resistivity materials, with the resistivity in the range of $10^4$ to $10^6$ Ω-cm at 25° C., allows the bias signal electrodes to be conductive at low frequencies and to function as a dielectric at high frequencies. Some examples of suitable relatively high resistivity materials include tantalum silicon nitride (TaSiN), titanium silicon nitride (TiSiN), silicon titanium oxynitride (SiTiON), amorphous silicon (Si), indium oxide ($In_2O_3$), tin oxide ($SnO_2$), zinc oxide (ZnO), etc. Notably, a reasonable success has been achieved with TaSiN, the resistivity of which is tailored by selecting appropriate parameters of the fabrication process. Note that the term TaSiN, as used herein, corresponds to a chemical composition that may be complex, and that is not necessarily represented by the 1:1:1 ratio suggested in the abbreviated chemical name. In other words, the actual formula may be more accurately represented by $Ta_xSi_yN_z$.

In other embodiments, the bias signal electrodes 520A, 520B, 720A, 720B, 820A, 820B, 920A, 920B, 1120A, 1120B, and 1221 are fabricated with a more conductive material, with resistivity between $10^0$ to $10^4$ Ω-cm at 25° C., but are fabricated to be relatively thin, that is, between 10 and 100 Angstroms thick.

In yet other embodiments, the bias signal electrodes 520A, 520B, 720A, 720B, 820A, 820B, 920A, 920B, 1120A, 1120B, and 1221 are fabricated using a relatively high resistivity material, between $10^4$ to $10^6$ Ω-cm at 25° C., covered by a thin layer of conductive material, between $10^{-6}$ to $10^0$ Ω-cm, and annealed to diffuse the conductive material into the high resistivity material.

For example, in one embodiment, the bias signal electrodes 520A, 520B, 720A, 720B, 820A, 820B, 920A, 920B, 1120A, 1120B, and 1221 are fabricated by coating a TaSiN layer with gold, or other metal, and annealing the gold coated TaSiN layer, in order to lower the resistivity of the TaSiN layer. Notably, TaSiN bias electrodes including a small amount of gold show high potential for the buried bias electrode embodiments described above. For example, the lower resistivity of these electrodes will increase the bandwidth for a signal applied to the bias electrode. In addition, the combination will result in less variation in resistivity and hence less variation of the bias bandwidth over the temperature. In fact, TaSiN layers commonly used for bias electrodes typically provide a bias bandwidth from 1 to 10 Hz, which may be too low for some applications. Reducing resistivity by one to three decades would increase bias bandwidth from 10 Hz to at least 100 Hz, or even as much as 10 kHz. In general, there is a trade-off between RF loss and resistivity of a bias electrode. If the bias electrode becomes too conductive, it will no longer be transparent to the RF field, causing additional RF loss for a signal on the RF electrode. The conductivity of the bias electrode can be optimized to maximize the bias bandwidth without increasing RF loss to an unacceptable value.

In another embodiment, a patterned nickel-chromium (NiCr) alloy film including a small amount of diffused gold is used to form the bias signal electrodes 520A, 520B, 720A, 720B, 820A, 820B, 920A, 920B, 1120A, and 1120B. For example, in one embodiment, the bias signal electrodes 520A, 520B, 720A, 720B, 820A, 820B, 920A, 920B, 1120A, and 1120B are fabricated by coating a NiCr allow film with a layer of gold, heating the gold covered film to cause some of the gold to diffuse into the NiCr layer, and removing the gold layer. In one embodiment, the layer is formed using the method described in U.S. Pat. No. 5,023,589, which is hereby incorporated by reference. Notably, the NiCr layer including diffused gold has been stated to have a temperature coefficient of resistance that is close to the NiCr alloy on which it is based.

It is to be understood that the optical modulators 500, 600, 700, 800, 900A, 900B, 1000, 1100, and 1200 are only examples of electro-optic devices that can be manufactured according to the present invention. It is also to be understood by those of skill in the art that various omissions and substitutions may be made without departing from the spirit and scope of the invention as defined by the appended claims.

What is claimed is:

1. An electro-optic device comprising:
   a substrate having an optical waveguide formed therein;
   an RF electrode structure for generating an RF electric field in an active section of the optical waveguide, the RF electrode structure including an RF signal electrode and at least one RF ground electrode, wherein the RF signal electrode is substantially parallel to the active section of the optical waveguide and is disposed above the active section of the optical waveguide;
   a buffer layer between the signal RF electrode and the optical waveguide, disposed over the substrate in at least a partial contact therewith; and
   a bias electrode structure for generating a biasing electric field in the active section of the optical waveguide, the bias electrode structure comprising a first bias signal electrode disposed substantially parallel to the active section of the optical waveguide between the RF ground electrode and the RF signal electrode and adjacent to one side of the active section of the optical waveguide, wherein the bias electrode structure is free of any electrodes at least partially disposed directly under the RF signal electrode, whereby the biasing electric field is generated in the active section of the optical waveguide by the first bias signal electrode with the RF signal electrode as a bias ground electrode.

2. The electro-optic device of claim 1, wherein the first bias signal electrode is disposed between the substrate and the buffer layer.

3. The electro-optic device of claim 1, wherein the first bias signal electrode is disposed on the buffer layer.

4. The electro-optic device of claim 1, wherein the at least one RF ground electrode includes first and second RF ground electrodes, and the RF signal electrode is disposed between the first and second RF ground electrodes forming a first inter-electrode gap between the first RF ground electrode and the RF signal electrode and a second inter-electrode gap between the second RF ground electrode and the RF signal electrode.

5. The electro-optic device of claim 4, further comprising a bleed layer having a bulk resistivity between $10^2$ and $10^8$ Ω-cm, supported by the buffer layer and is disposed below the RF signal electrode, in electrical contact with the RF signal electrode and the first and second RF ground electrodes.

6. The electro-optic device of claim 1, wherein the buffer layer comprises a material having a bulk conductivity between $10^{-19}$ and $10^{-16}$ (Ω-cm)$^{-1}$.

7. The electro-optic device of claim 1, wherein the first bias signal electrode comprises at least one material selected from the group consisting of tantalum silicon nitride, titanium silicon nitride, silicon titanium oxynitride, amorphous silicon, indium oxide, tin oxide, and zinc oxide.

8. An electro-optic device comprising:
   a substrate having an optical waveguide formed therein;
   an RF electrode structure for generating an RF electric field in an active section of the optical waveguide, the RF electrode structure including first and second RF ground electrodes and an RF signal electrode disposed therebetween and forming a first inter-electrode gap between the first RF ground electrode and the RF signal electrode and a second inter-electrode gap between the second RF ground electrode and the RF signal electrode, wherein the RF signal electrode is substantially parallel to the active section of the optical waveguide and is disposed above the active section of the optical waveguide;
   a buffer layer between the signal RF electrode and the optical waveguide, disposed over the substrate in at least a partial contact therewith; and
   a bias electrode structure for generating a biasing electric field in the active section of the optical waveguide, the bias electrode structure comprising first and second bias signal electrodes disposed substantially parallel to the active section of the optical waveguide adjacent to and on opposite sides of the active section of the optical waveguide, wherein the first bias signal electrode is disposed in the first inter-electrode gap, and the second bias signal electrode is disposed in the second inter-electrode gap;

wherein the bias electrode structure is free of any electrodes at least partially disposed directly under the RF signal electrode, whereby the biasing electric field is generated in the active section of the optical waveguide by the first bias signal electrode with the RF signal electrode as a bias ground electrode.

9. The electro-optic device of claim 8, wherein the first and second bias signal electrodes are disposed in first and second slots in the substrate, respectively, between ridges of the slots.

10. An electro-optic device comprising:
a substrate having an optical waveguide formed therein;
an RF electrode structure for generating an RF electric field in an active section of the optical waveguide, the RF electrode structure including an RF signal electrode and at least one RF ground electrode, wherein the RF signal electrode is substantially parallel to the active section of the optical waveguide and is disposed above the active section of the optical waveguide;
a buffer layer between the signal RF electrode and the optical waveguide, disposed over the substrate in at least a partial contact therewith, the buffer layer comprising a material having a bulk conductivity between $10^{-19}$ and $10^{-16}$ $(\Omega\text{-cm})^{-1}$;
a bias electrode structure for generating a biasing electric field in the active section of the optical waveguide, the bias electrode structure comprising a first bias signal electrode disposed substantially parallel to the active section of the optical waveguide and adjacent to one side of the active section of the optical waveguide, wherein the bias electrode structure is free of any electrodes at least partially disposed directly under the RF signal electrode, whereby the biasing electric field is generated in the active section of the optical waveguide by the first bias signal electrode with the RF signal electrode as a bias ground electrode; and
a bleed layer having a bulk resistivity between $10^2$ and $10^8$ $\Omega$-cm, wherein the bleed layer is supported by the buffer layer and disposed below the RF signal electrode in electrical contact therewith, wherein the bleed layer has a gap over the first bias signal electrode, such that the bleed layer only partially overlaps the first bias signal electrode.

11. An electro-optic device comprising:
a substrate having an optical waveguide formed therein;
a first buffer layer supported by the substrate;
a second buffer layer disposed over the first buffer layer in at least a partial contact therewith, wherein the second buffer layer is less conductive than the first;
an RF electrode structure for generating an RF electric field in an active section of the optical waveguide, the RF electrode structure including first and second RF ground electrodes and an RF signal electrode therebetween, forming a first inter-electrode gap between the first RF ground electrode and the RF signal electrode, and a second inter-electrode gap between the second RF ground electrode and the RF signal electrode, wherein the RF signal electrode is substantially parallel to the active section of the optical waveguide and is disposed over the second buffer layer and directly above the active section of the optical waveguide; and
a bias electrode structure disposed between the first and the second buffer layers, for generating a biasing electric field in the optical waveguide, the bias electrode structure comprising:
a bias signal electrode disposed between the RF signal electrode and the active section of the optical waveguide, substantially parallel to the active section of the optical waveguide, and
first and second bias ground electrodes disposed on opposite sides of the active section of the optical waveguide in first and second slots in the substrate, respectively, between ridges of the slots,
whereby the biasing electric field is created across the active section of the optical waveguide when a voltage is applied between the bias signal electrode and the first and second bias ground electrodes.

12. The electro-optic device of claim 11, further comprising a bleed layer for removal of electrical charges, wherein the bleed layer has a bulk resistivity between $10^2$ and $10^8$ $\Omega$-cm, wherein the bleed layer is supported by the second buffer layer and disposed below the RF signal electrode, in electrical contact with the RF signal electrode and the first and second RF ground electrodes.

* * * * *